April 19, 1927.  1,625,027

T. W. HULSE

ANIMAL TRAP

Filed March 26, 1926    2 Sheets-Sheet 1

Inventor
Thomas W. Hulse,
By Clarence A. O'Brien
Attorney

April 19, 1927. 1,625,027
T. W. HULSE
ANIMAL TRAP
Filed March 26, 1926 2 Sheets-Sheet 2
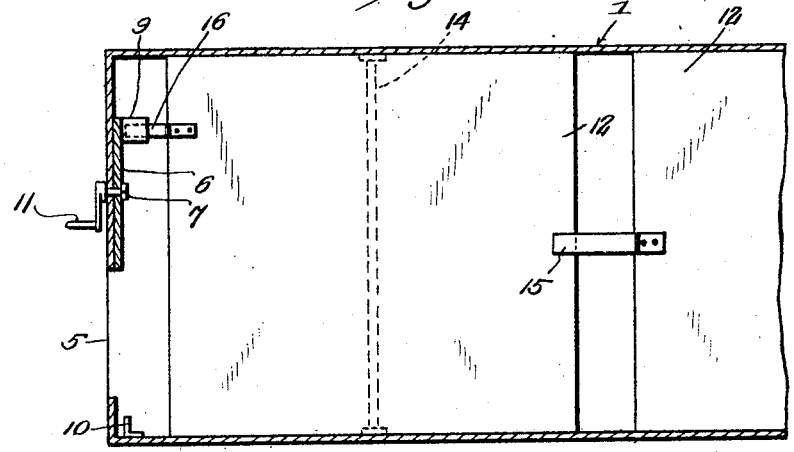
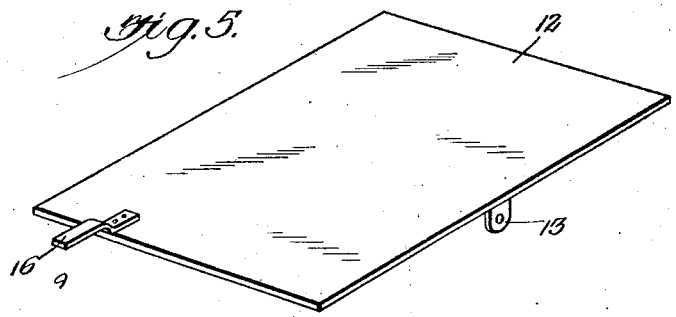
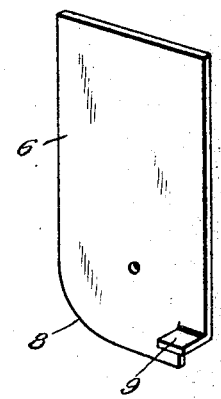
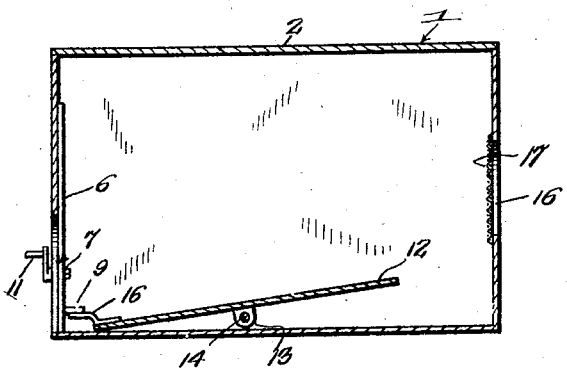
Inventor
Thomas W. Hulse,
By Clarence A. O'Brien
Attorney Patented Apr. 19, 1927.

1,625,027

UNITED STATES PATENT OFFICE.

THOMAS WILLIAM HULSE, OF INVER GROVE, MINNESOTA.

ANIMAL TRAP.

Application filed March 26, 1926. Serial No. 97,630.

This invention relates to an improved animal trap for catching small animals of various kinds, particularly those used for fur bearing purposes.

Briefly, the invention has reference to a trap including a housing having at least one entrance opening, there being a swinging closure for this opening and a pivotally mounted animal actuated platform in the housing, together with a novel operating connection between the platform and the closure whereby when the platform is tripped, the closure will be swung to a position to cover the entrance opening, whereby to safely entrap the animal in the housing.

One feature of construction is the arrangement of platforms which are so mounted as to render them exceedingly sensitive to easy operation, these platforms being so interconnected that they are simultaneously operated.

A further feature of construction consists in the making of the door in the novel configuration, and so pivoting the door that it is normally maintained in an open position but is readily moved to a place where it will drop by gravity to close the entrance opening.

A further feature of construction is the resetting means for the door and also the coacting means between the adjacent end of the platform and door for swinging the latter to a closing position.

Other features and advantages will become apparent during the following description and drawing.

In the accompanying drawing forming a part of this application and in which like numerals are employed to designate like parts throughout the same:

Figure 3 is a transverse section taken approximately upon the plane of the line 3—3 of Figure 2.

Figure 4 is a horizontal section through the lower portion of the trap showing the door tripping means more clearly.

Figure 5 is a perspective view of one of the platforms.

Figure 6 is a perspective view of one of the closing doors,

Figure 8 is a longitudinal section through a slightly modified form of the invention.

Figure 7:
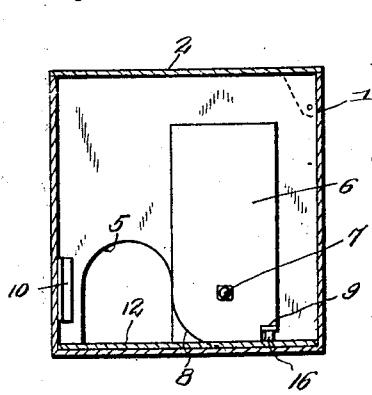
Figure 7 is a detail view of the cover retaining means.

Referring to the drawings in detail, the reference character 1 designates generally an appropriately constructed housing which is preferably of elongated rectangular configuration. This housing or casing is open at its top but is normally maintained closed by a swinging cover 2. This cover is provided with a spring latch 3 which engages a keeper 4 on the housing, whereby to retain the cover closed. This construction is plainly shown in Figure 7.

Confining attention first to Figures 1 to 7 inclusive, it will be seen that each end of the casing has a restricted entrance opening 5 of the shape shown. This opening is adapted to be covered by a gravity lowered closing plate 6 (see Figure 3). This closing plate is pivoted between its center and lower end as at 7 and one corner of the lower end portion is rounded as indicated at 8. At the same end a tongue 9 is struck out and extends at right angles. When the door swings down to closed position, the upper end portion is confined by a guide and keeper 10. At this time it will be noted, as shown in Figure 4, that the pivot pin for the door is in the form of a small bolt which is provided on its outer end with a hand crank 11. Thus after the door is swung down to closed position the crank may be turned to lift it up again to open position.

Figure 1:
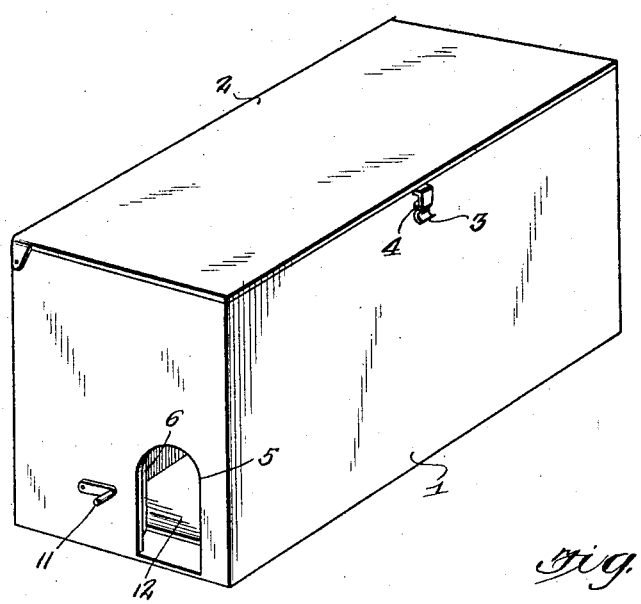
Figure 1 is a perspective view of a trap constructed in accordance with the invention.
Figure 2:
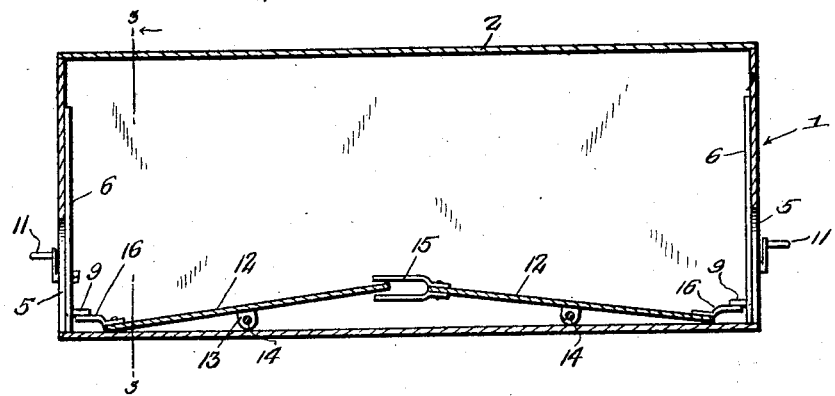
Figure 2 is a longitudinal section through the same.

Confining attention now more particularly to Figure 2 it will be seen that the platforms are designated by the reference characters 12. These platforms are provided with downturned apertured ears 13 pivotally mounted upon cross rods 14. The ears are between the ends of the platform so that they are properly balanced, but normally assume the relative inclined position shown in Figure 2. One of the platforms is provided with a pair of spaced members 15 providing a connection between the two platforms whereby they are simultaneously depressed. Each platform is provided at its outer end with a lifting finger 16 which is located directly beneath the outstanding tongue 9 when the door 6 is in the upright position shown in Figure 3.

In operation it will be seen that an animal may enter the casing at either end through the entrance openings 5. In this connection it will be stated that a suitable bait may be placed in the casing to entice the animal to enter. As the animal walks upon the platform and passes beyond the pivotal mounting of the platform, the inner end portions of the platforms will be overbalanced and both platforms will be depressed. In so doing, the outer end portions of the platforms will be lifted upwardly and the lifting fingers 16 will engage the tongues 9 in such a way as to swing the closures 6 through a partial arc. When the closures move beyond a certain point, they will drop by gravity to a position to close both entrance openings, thus preventing the escape of the animal. During this time, the rounded corners 8 of the doors will clear the floor of the casing to permit freedom of movement of the doors. To reset the trap it is only necessary to grasp the hand cranks 11 and to lift the doors up to vertical open position.

No doubt by considering the description in connection with the drawings, the operation of the trap will be clear.

At this time I would state that in Figure 8 I show substantially the same construction with the exception that the casing is provided at one end with a window 16 covered by a closing screen 17. In this form of the invention I show but a single platform and a single door. Otherwise the invention is identical with that described, and therefore the same reference characters may be properly used here to designate corresponding parts.

It is believed that the invention is clear from the description and drawings, and a more lengthy description is probably unnecessary.

Minor changes coming within the field of invention claimed may be resorted to if desired.

Having thus described the invention, what I claim as new and desire to secure by Letters Patent is:—

1. In a trap of the class described, a casing having an animal entrance opening, a door pivotally and swingably mounted in the casing in a position to cover said opening, said door being adapted to swing by gravity to closing position, a pivotally mounted animal actuated platform in the casing, a lifting finger carried by the platform, and a tongue carried by said door, said finger being engaged with said tongue when the door is in an open position whereby when the platform is tilted an impetus is given to the door to permit it to gravitate to closing position.

2. In a trap of the class described, a casing having an animal entrance opening at one end, a door pivotally and swingably mounted on the interior of said end wall in a position to swing down and cover said opening, said door being swingable to closing position under the action of gravity, the lower end portion of the door being rounded on one corner, a portion of the metal being struck out to provide a tongue at said lower end, the pivotal connection for the door being slightly above said curved corner and tongue and below the vertical center of the longitudinal dimension of the door, an animal actuated platform pivotally mounted between its ends in the casing, the inner end of said platform being normally disposed upwardly and the opposite ends being disposed on a lower plane, and a finger of right-angular formation carried by the outer lower end of said platform in a position to engage beneath said tongue when the door is in open position, whereby when the platform is tilted, an impetus is given the door to permit it to gravitate to closing position.

In testimony whereof I affix my signature.

THOMAS WILLIAM HULSE.